Sept. 12, 1967 P. GIUFFRIDA ETAL 3,341,273

METHOD OF MANUFACTURING PHOTOSENSITIVE DEVICES

Original Filed June 19, 1963

3,341,273

METHOD OF MANUFACTURING PHOTO-SENSITIVE DEVICES

Philip Giuffrida, North Andover, John Pratt, Braintree, and Donald L. Graves, Woburn, Mass., assignors to Electronics Corporation of America, Cambridge, Mass., a corporation of Massachusetts Original application June 19, 1963, Ser. No. 288,963. Divided and this application Nov. 14, 1966, Ser. No. 605,114
7 Claims. (Cl. 316—22)

Figure 1:
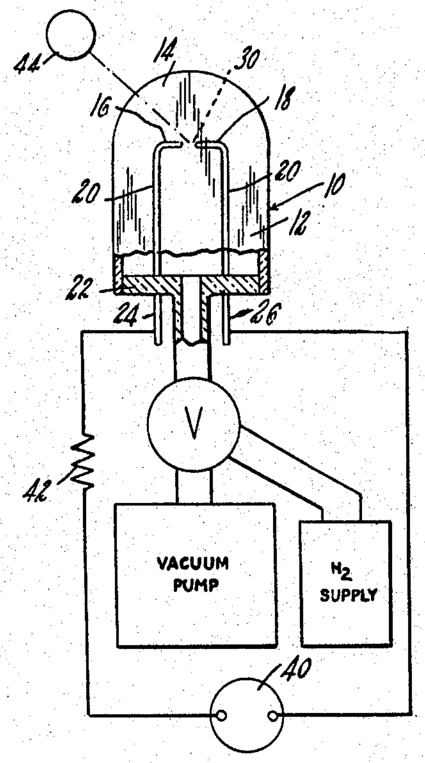

This application is a division of Serial No. 288,963 filed June 19, 1967.

This invention to photosensitive devices in general and more particularly to novel and improved methods of manufacturing photosensitive devices of the gas discharge type.

An object of the invention is to provide a novel and improved photosensitive structure of the gas discharge type which enables the provision of a reliable radiation detector tube device of controlled and accurate radiation wavelength response which is smaller in configuration and more versatile in application than corresponding devices heretofore available.

In combustion supervision systems of the type employed to supervise the continued existence of a flame in a furnace for example, the flame sensor must accurately discriminate between radiation from the flame and radiation from other sources. A combustion flame includes a concentrated source of ultraviolet radiation of wavelength shorter than that of solar radiation, and an ultraviolet radiation detector responsive only to those shorter wavelengths thus would be suitable for use as a flame sensor in such a control system. Gaseous discharge devices which employ a pair of spaced electrodes across which an electrostatic field is established which have electrodes of the proper work function (corresponding to the radiation wavelength of interest) have been used for this purpose. In these devices the radiation of proper wavelength impinging on an electrode produces photoelectrons which initiate an avalanche breakdown between the electrodes and produce a current pulse as a signal of the presence of the radiation of interest. In order for the device to operate properly and not produce spurious responses, it is essential that the electrodes and the chamber be purified so that the electrodes have a uniform work function and the structure is not excessively contaminated. Several materials have work functions suitable for sensing ultraviolet radiation from combustion flames exclusively. A commonly used metal is tungsten, which theoretically provides the desired work function. To obtain such work function characteristics the tungsten wire is heated in a purification and crystal growth operation. Conventionally, the electrode elements in such gas discharge type devices have been treated to produce photosensitive characteristics either by resistance heating or by induction heating. While either technique produces ultraviolet sensitivity both have limitations. The resistance heating technique necessitates the use of an electrode structure with two conductive supports so that electric current may be passed through the electrode. In addittion to the two support limitations, those supports must be large enough so that they are not heated sufficiently to produce fracture of the glass press in which they are conventionally secured. Such tubes produced by this means are characterized by their relatively large size to provide adequate heat dissipation characteristics and the double supports for the electrode structure to enable the application of current flow through the electrode structure. The induction heating technique, on the other hand, requires an electrode configuration that is compatible with the configuration of the electromagnetic field in which it is immersed so that uniform heating of the electrode structure is achieved. Such an electrode configuration is often difficult to achieve and also tends to increase the size of the device.

Accordingly, another object of the invention is to provide a novel and improved method for processing metallic elements to obtain uniform photosensitivity characteristics in those elements.

A further object of the invention is to provide a novel and improved method of heating the metallic electrode elements to produce purification and crystal growth such that symmetrical areas of two electrode elements have uniform work functions.

Still another object of the invention is to provide a novel and improved method of producing an improved compact ultraviolet radiation sensitive detector tube of greater reliability which is particularly adapted for use in combustion control systems.

Figure 2:
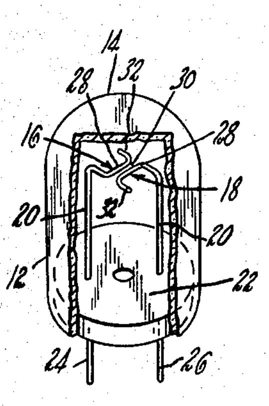
Figure 3:
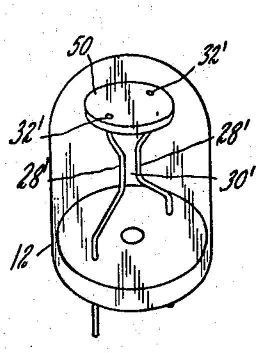

Other objects, features and advantages of the invention will be seen as the following description of preferred embodiments thereof progresses, in conjunction with the drawings, in which:

FIG. 1 is a diagrammatic view of apparatus for processing a radiation detector tube in accordance with the invention;

FIG. 2 is a perspective view of the tube shown in FIG. 1 showing the arrangement of the electrode elements and the photosensitive region; and FIG. 3 is a diagrammatic view of a modified form of radiation sensitive device of the gaseous discharge type in which the photosensitive region of the electrode elements is disposed vertically within the tube envelope for side view radiation sensing rather than end view radiation sensing as in the tube shown in FIGS. 1 and 2.

With reference to FIG. 1, a radiation detector tube 10 is shown in the process of manufacture. The tube includes a cylindrical glass envelope 12 transparent to the radiation of interest, for example a borosilicate glass such as Corning type 9741, domed at the upper end 14 in which are positioned a pair of cylindrical electrode elements 16, 18 which are of uniform diameter. Each electrode element is positioned within the envelope by means of a support element 20 that extends through the glass press 22 to terminal elements 24, 26. In the preferred embodiment each electrode element and associated support and terminal elements is formed of a tungsten wire .016″ in diameter. Each electrode element portion is disposed at right angles to its support element portion and includes a straight portion 28 that is parallel to the corresponding straight portion of the other electrode element and spaced 0.030″ from that corresponding straight portion so that a working region 30 is defined between those straight portions. In an alternate arrangement, the tungsten electrode element and support element may be welded to a Kovar insert which is secured in the glass press 22 of the tube in conventional manner. The unsupported end portion 32 of each electrode element 16, 18 extends away from the working region 30 and the other electrode element so as to avoid distortion of an electrostatic field which is being created by impressing a voltage across the electrodes. The tube envelope and press form a vacuum tight chamber which, when completed, is filled with an ionizable gas such as an inert gas or hydrogen or a combination thereof, which, when a voltage is impressed across the electrodes, will break down and conduct current between the electrodes in the manner of a Geiger-Müller tube.

In the processing of the electrode elements, as indicated above, it is necessary to provide smooth surfaces in the working region to avoid aberrations which would create points of electrostatic field stress that would adversely affect the breakdown voltage characteristics of the tube, and uniform photosensitivity characteristics, that is, a uniform photoelectric work function of the electrodes in the working section.

Where commercially pure tungsten wire is utilized, the wire is initially positioned in the glass press 22 and then electropolished to provide a smooth surface configuration, and subsequently washed to remove surface contaminants and other materials that may be removed by that means. The electrode materials are then secured in the envelope with the glass press sealed to the envelope. The tube is then placed on a vacuum system, as shown in FIG. 1, and evacuated to a pressure of less than $10^{-5}$ millimeters of mercury and is baked four hours at 400° C. to outgas the stem, envelope, electrodes and support elements. After this outgassing operation, the tube is filled to a pressure of one hundred fifty millimeters of mercury with a highly purified hydrogen (passed through a palladium filter for example).

The tube electrode terminals 24, 26 are then connected to an adjustable source of A.-C. voltage 40 through a current limiting resistor 42 as shown in FIG. 1, and the voltage is slowly increased. Preferably, the working region 30 of the electrodes simultaneously is subjected to ultraviolet radiation from a high power ultraviolet source such as an ozone lamp 44. At approximately six hundred volts with the above-mentioned electrode spacing in the working region of 0.030″, a glow discharge is initiated between the electrodes and this discharge rapidly becomes an arc discharge. The source 40 is then adjusted as necessary to control the arc discharge so that the electrode portions in the working region are heated to incandescent temperature. During this operation it is usually necessary to reduce the voltage applied to the electrodes somewhat to prevent excessive heating of the electrode elements in the working region. When the electrode element portions reach incandescence, the radiation source 44 may be removed and the arc discharge is maintained between the electrodes due to thermionic emission. The temperature of the electrode elements is then sensed by pyrometric methods and that temperature is gradually increased by voltage control to 1400° K. over a period of twenty minutes. This temperature is maintained at 1400° K. for a period of twelve minutes during which time impurities are driven off the electrode surfaces in the working region and crystal growth occurs within those electrode element portions. At the end of this processing time, the hydrogen fill is removed from the tube in an evacuating operation which causes the discharge to cease. The temperature of the electrode portions is reduced by this operation within a period of about two minutes, and the voltage source then may be disconnected.

The arc discharge is confined to but uniformly extends throughout the working region which is the critical region of photosensitivity. Thus, in tubes constructed in accordance with the invention, uniformly intense heat is produced throughout the working region while no substantial heat is generated in the support element portions so that thermal expansion and shock is minimized. A relatively small diameter support element may be employed with this processing method, thereby reducing the glass to metal seal area and making that seal less subject to fracture due to thermal causes.

After this photosensitivity treatment, the gas is removed by evacuating the tube to a pressure to the order of $10^{-5}$ millimeter of mercury. The final gas fill is then introduced into the tube and the tube is sealed off.

The tube is then subjected to an aging processing at which it is continuously operated at breakdown operation with an A.-C. voltage in excess of six hundred volts applied to the tube electrodes through a current limiting resistor so that minor impurities which may have been introduced during seal off treatment, for example, are driven from the electrodes.

A tube manufactured as described above is substantially completely unresponsive to solar ultraviolet radiation while reliably responding to combustion flame. The tube diameter may be in the order of ½″ with a working region length of ¼″. This compact radiation detector tube configuration is ideally suited for use as a flame detector with gas-fired process burners (so-called "tunnel" burners).

A variety of electrode sizes, spacings and configurations may be used with the invention. For example, the electrode configuration shown in FIG. 3 may be employed. In that arrangement the straight electrode portions 28′ are disposed vertically within the tube (parallel to the envelope axis) with the end portions 32′ spaced further apart so that the closest electrode portions are in the working region 30′. Auxiliary insulating support members such as glass beads 50 may be employed to support the electrodes if desired. The electrode may also be formed in a loop with a portion of the loop comprising the working region.

While preferred embodiments of the invention have been shown and described, modifications of those embodiments wil be apparent to those skilled in the art, and therefore it is not intended that the invention be limited to the disclosed embodiments or to details thereof and departures may be made therefrom within the spirit and scope of the invention as defined in the claims.

We claim:

1. The method of processing electrode elements for use in radiation sensitive devices comprising the steps of placing two spaced metal elements in an ionizable gas, applying an electric potential across said metal elements to create an electrostatic field between said elements of a magnitude sufficient to initiate an arc discharge between said elements, and controlling said applied electric potential to gradually heat said metal elements up to incandescent temperature in a purification and crystal growing operation to produce improved photosensitive characteristics in the regions of said metal elements that are heated to incandescent temperature.

2. The method as claimed in claim 1 wherein said metal elements are tunsgten wires.

3. The method as claimed in claim 1 wherein said ionizable gas includes hydrogen.

4. The method of processing electrode elements to produce improved photosensitive characteristics comprising the steps of placing two electrode elements in an ionizable reducing atmosphere in spaced relation such that corresponding working region portions of the electrode elements are the closest portions of those elements, subjecting said electrode elements to an ultraviolet radiation source, applying an electric A-C potential to said electrode elements of a magnitude sufficient to initiate an arc discharge between said working region portions, and controlling said potential to heat said working region portions to incandescent temperature to provide said working region portions with improved photosensitive characteristics.

5. The method of manufacturing a radiation detector tube comprising the steps of disposing two electrode elements in an ionizable atmosphere in a radiation permeable envelope, applying an electric alternating current potential to said electrode elements to create an electrostatic field between said electrodes of a magnitude sufficient to initiate avalanche breakdown of said atmosphere between said electrode elements and create an arc discharge, gradually controlling the voltage to the applied potential while maintaining said arc discharge to gradually heat said electrode elements up to an incandescent temperature, removing said atmosphere from said envelope, refilling said envelope with an ionizable gas, and sealing said envelope.

6. The method of manufacturing a radiation detector tube comprising the steps of disposing two electrode elements in an ionizable atmosphere in a radiation permeable envelope, subjecting said electrode elements to an ultraviolet radiation source, applying an electric potential to said electrode elements while said elements are exposed to said radiation source to create an electrostatic field between said electrodes of a magnitude sufficient to initiate avalanche breakdown of said atmosphere between said electrode elements and create an arc discharge, gradually controlling the voltage to the applied potential while maintaining said arc discharge to gradually heat said electrode elements up to an incandescent temperature, removing said atmosphere from said envelope, refilling said envelope with an ionizable gas, and sealing said envelope.

7. The method of manufacturing a radiation detector tube comprising the steps of disposing two tungsten wire electrode elements in an ionizable reducing atmosphere in a radiation permeable envelope, subjecting said electrode elements to an intense ultraviolet radiation source, applying an electric alternating current potential to said tungsten wire elements while said elements are exposed to said radiation source to create an electrostatic field between said electrodes of a magnitude sufficient to initiate avalanche breakdown of said atmosphere between said electrode elements, controlling the applied potential to gradually heat said wire elements up to a temperature in the order of 1400° K., maintaining said temperature for a period of less than one hour, and thereafter removing said reducing atmosphere from said envelope, refilling said envelope with an ionizable gas, and sealing said envelope.

References Cited

UNITED STATES PATENTS

| | | | |
|---|---|---|---|
| 1,935,939 | 11/1933 | Case | 316—22 X |
| 2,029,040 | 1/1936 | Stilwell | 316—22 X |
| 2,047,371 | 7/1936 | Ives | 316—22 X |
| 2,097,467 | 11/1937 | Prescott | 316—22 X |

RICHARD H. EANES, Jr., *Primary Examiner.*